United States Patent [19]

Spilker

[11] Patent Number: 5,625,363
[45] Date of Patent: Apr. 29, 1997

[54] PAGING/MESSAGING SYSTEM USING GPS SATELLITES

[75] Inventor: James J. Spilker, Woodside, Calif.

[73] Assignee: Stanford Telecommunications, Inc., Sunnyvale, Calif.

[21] Appl. No.: 413,986

[22] Filed: Mar. 15, 1995

[51] Int. Cl.$^6$ ................................ H04B 7/185; G01S 5/02
[52] U.S. Cl. .................... 342/352; 342/353; 342/357; 455/12.1
[58] Field of Search .................... 342/357, 353, 342/352; 455/12.1, 13.1

[56] References Cited

U.S. PATENT DOCUMENTS

5,153,598 10/1992 Alves, Jr. .................... 342/357

*Primary Examiner*—Gregory C. Issing
*Attorney, Agent, or Firm*—Jim Zegeer, Esq.

[57] ABSTRACT

A paging/messaging system using the L3 transmission channel of a constellation of GPS satellites orbiting the earth, is comprised of an earth-based injection terminal having a source of paging/messaging signals and a radio transmitter for broadcasting paging/messaging on the L3 transmission channel to in-view ones of the constellation of GPS satellites. A plurality of earth-based mobile receiving stations, each mobile receiving station having an omnidirectional receiving antenna and an L3 transmission channel receiver for receiving the L3 transmission channel broadcasts from the in-view ones of the constellation of GPS satellites and demodulating and decoding to recover the paging/messaging signals, a display as used to present the paging/messaging signals to a designated user the recovered paging/messaging signals. At least one of said earth-based mobile receiving stations includes GPS position receiver for receiving GPS signals from the in-view satellites and determining the position of the mobile receiving station, and presenting the position information to the user on the display.

4 Claims, 8 Drawing Sheets

Number of Satellites in View
(a) 0° Latitude-Equator

FIG. 7A

Number of Satellites in View
(b) 35° Latitude

FIG. 7B

Number of Satellites in View
(c) 40° Latitude

FIG. 7C

Number of Satellites in View
(d) 90° Latitude-Pole

PAGING/MESSAGING SYSTEM USING GPS SATELLITES

The present invention is directed to a paging/messaging system.

The objective of this invention is to provide an efficient, low cost system and method of transmitting secure messages to individuals (civilians or military). The invention employs unused capacity on the L3 downlink for the Nudet Detection System (NDS) which is carried on current Block II and Block IIA and future Block IIR GPS satellites. The GPS Paging/Messaging System (GP/MS) of this invention operates without any changes to the satellites, has no impact upon the GPS navigation system, and has insignificant impact upon operation of the NDS. This invention permits both the GPS and the NDS to function at full capability while providing the additional GPS Paging/Messaging System capability. This system employs a Paging/Messaging Injection terminal (P/MIT), which can be transported on a vehicle, to transmit secure, individually addressed 100 character messages to users carrying a shirt pocket-sized Paging/Messaging Receiver (P/MRX) or to similar sized vehicular receivers. The users generating the messages can be remote from the paging/messaging injection terminal and connect to it by way of Mobile Subscriber Equipment (MSE). The users receiving the messages can be anywhere in a broad geographical area covering thousands of miles. The system is capable of transmitting between 10,000 and 20,000 messages per day to a given area. The paging/messaging injection terminal synchronizes with GPS passively by using the navigation signals. The GPS Paging/Messaging System has the following advantages over other message broadcast systems:

1) The uplink to the satellite, in contrast to other systems which utilize UHF satellites with turnaround transponders, is jam resistant. Many prior art systems are easily jammed.

2) The hand-held or vehicle mounted paging/messaging receiver can operate "on the move" and is capable of being built at costs in the same price range as GPS receiver. In fact, the paging/messaging receiver function can be an add-on to certain GPS receivers.

3) The paging/messaging injection terminal can be transportable, e.g., mounted on the back of a vehicle and can be ready to transmit messages within a minute or so after stopping.

4) From a single paging/messaging injection terminal site location, perhaps having multiple mobile or fixed uplink antennas, thousands of messages per day can be broadcast to users over more than half of the earth, around the clock, in all weather.

5) The system can provide worldwide coverage including the polar regions which are not accessible from a geostationary satellite.

6) Messages can be transmitted within tens of seconds of origination as opposed to hours as required by some other systems and the paging/messaging injection terminal provides the message originator an acknowledgment that the message has been transmitted.

DESCRIPTION OF THE DRAWINGS

The above and other objects, advantages, and features of the invention will become more apparent when considered with the following specification and accompanying drawings, wherein.

DETAILED DESCRIPTION OF THE INVENTION

Figure 1:
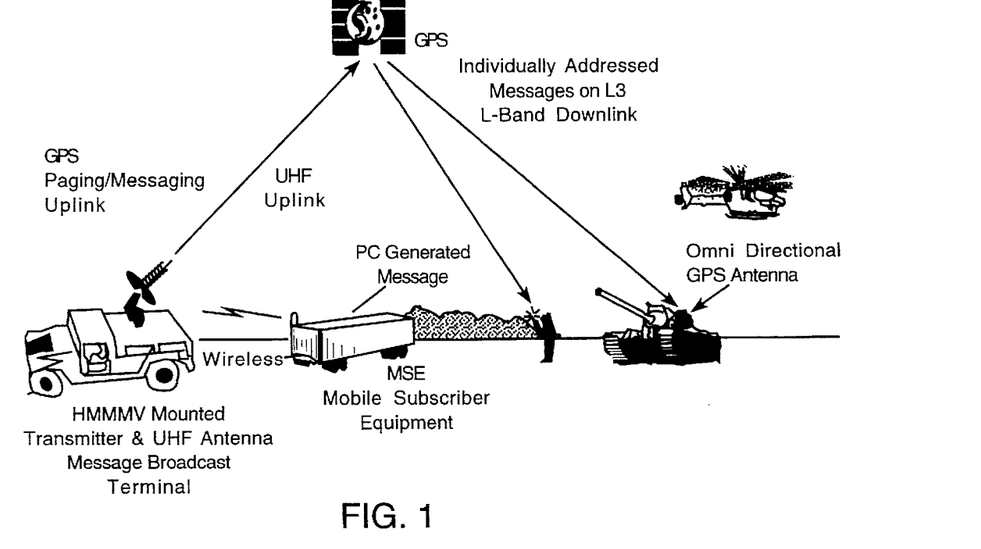
FIG. 1 is a diagrammatic illustration of a GPS Paging/Messaging System incorporating the invention.

FIG. 1 shows a typical application of the GPS Paging/Messaging System incorporating the invention. A user in the mobile subscriber network dials a number which connects to the paging/messaging injection terminal, then enters a number corresponding to the address of the user or group of users for which the message is intended, and follows this coded address by a message of up to 100 ASCII characters. Messages generated in a user's PC are communicated over the mobile subscriber equipment network and then transmitted to the paging/messaging injection terminal where they are coded and transmitted to the GPS satellite at UHF. Once the message is transmitted to the ground by the GPS satellite, the GPS uplink controller relays a message to the message requester that the message has been sent.

The message is then formatted, coded, secured, and transmitted to the appropriate GPS satellite on a UHF anti-jam (AJ) uplink. The message is demodulated in the satellite and rebroadcast on the L3 downlink. As the message is transmitted, the paging/messaging injection terminal also receives the message using a local P/MR, allowing verification of proper transmission. The paging/messaging injection terminal then acknowledges this fact to the message originator. The entire sequence of events should take no more than 10 to 40 seconds except when there is a long backlog of messages to be transmitted. The system is capable of transmitting 2400 messages per day using one uplink antenna and one satellite. Typically four or more GPS satellites are visible from one paging/messaging injection terminal. Using four satellites and four uplink antennas the system can thus transmit nearly 10,000 messages per day.

The GPS Paging/Messaging System of this invention will utilize the L3 downlink and communications relaying capability of the NDS payload on the GPS satellites to provide a unique, worldwide broadcast system. Implementation will not require new or additional space assets and will not interfere with the full mission capability of the GPS satellite system.

SYSTEM CAPABILITIES

Figure 2:
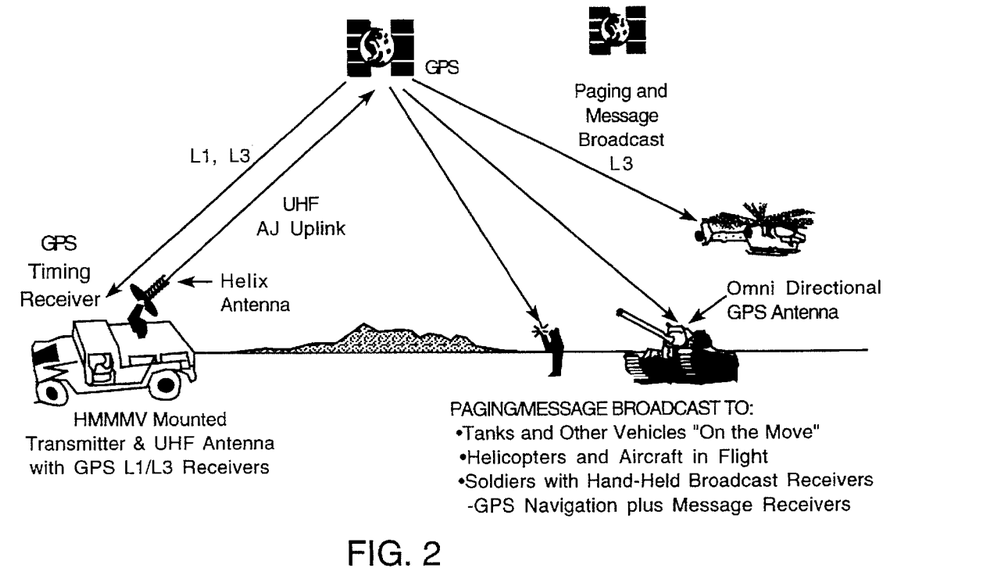
FIG. 2 is a simplified view of a GPS Paging/Messaging System incorporating the invention.

The invention provides a worldwide, all-weather, around-the-clock, secure, one-way paging/messaging system to hand-held, mobile, or air transport receivers with a set of important features. A pictorial representation of this concept is shown in FIG. 2. Users can be reached anywhere in the entire northern hemisphere from a single ground site. The message/paging source can be either a mobile paging/messaging injection terminal on a HMMWV or a fixed paging/messaging injection terminal perhaps with several antennas. The GPS Paging/Messaging System employs the GPS satellite constellation using the present on-orbit GPS Block II and IIA satellites, and future GPS Block IIR satellites. There is no added cost for the GPS space segment, and the system operates with no degradation to either the present GPS transmission or to the Nudet Detection System. GPS Paging/Messaging System operates by using unused time slots in the GPS/NDS L3 downlink. The cost of the hand-held paging/messaging receiver can be comparable with that for GPS navigation receivers if the production volumes are sufficient. Low cost production receivers are possible since tile technology for the P/MR is similar to (but not the same as) that used for conventional GPS navigation receivers.

Some of the key capabilities of this system are:

GPS Paging/Messaging System provides a worldwide paging/messaging capability with all weather, around-the-clock operation.

Approximately 10,000 to 20,000 messages of 100 characters each can be transmitted to a given local per day. A fixed site may operate with several uplink antennas and can broadcast messages to users over an entire hemisphere.

Users can be addressed individually or in groups.

Messages can be received while users are stationary or moving. This provides the capability to provide direction to movable terminals which cannot otherwise communicate while they are moving.

Message delivery times are in the tens of seconds.

Redundant messages can be provided to improve delivery reliability.

Users can operate either with a hand-held receiver or a receiver mounted in an aircraft, Helicopter, or other vehicle on the move. The hand-held receiver can be ergonomically sized to be able to fit in a shirt pocket.

If desired, a single receiver can provide both GPS navigation and message reception.

The invention employs the existing Nudet Detection System (NDS) communications link (L3). It is unlikely that the full GPS/NDS capability will ever be needed since NDS is designed to handle data front large numbers of simultaneous Nudets. However, even if it is, the present invention has absolutely no impact on the NDS system and makes use of capacity which is never used by the present NDS system.

Figure 3:
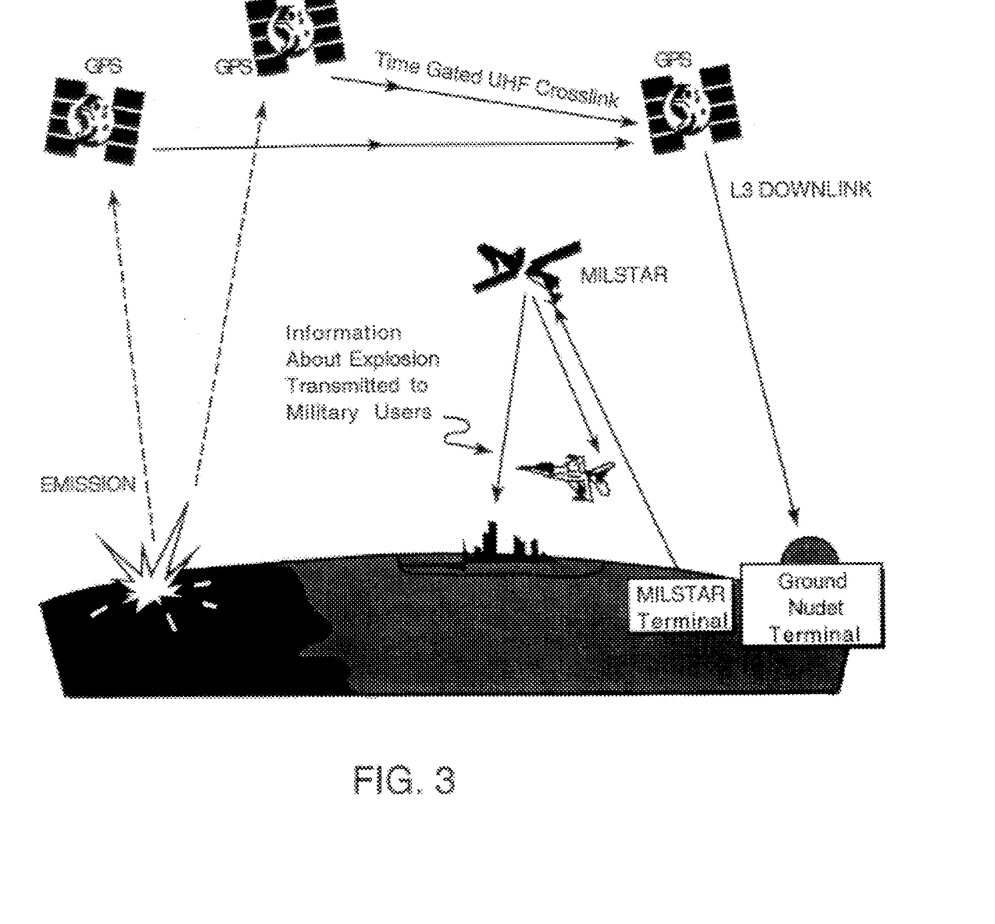
FIG. 3 (prior art) shows the normal use of the NDS L3 channel.

When the NDS system aboard a GPS satellite detects a Nudet, it disseminates data about the Nudet to other GPS satellites via a UHF cross-link. Each GPS satellite has a 1.5 second time slot for its transmissions to other satellites, and there are 24 slots in all giving a total frame time of 36 seconds. Operation of the NDS is shown in FIG. 3. This figure shows the normal use of NDS L3 channel. Emissions from a Nudet are detected by the NDS payload on GPS and transmitted on a UHF cross-link in a time slot assigned to the transmitting satellite as well as being transmitted directly to ground. Other satellites in view receive this crosslink, reformat it, and relay it in a slightly delayed time slot on an L-band downlink.

The GPS Paging/Messaging System uplink transmitted by the paging/messaging injection terminal mimics the cross-link signal. This uplink is an anti-jam, secure, frequency-hopped signal, operating in the VHF/UHF frequency band. The satellite processor dehops the UHF signal, demodulates the data, reformats the data and remodulates the received bit stream onto the L3 downlink at 1381.05 MHz. This frequency is roughly midway between the normal GPS navigation link frequencies which are at 1575.42 MHz and 1227.6 MHz respectively, allowing reception of all three signals using a properly designed antenna.

Figure 4:
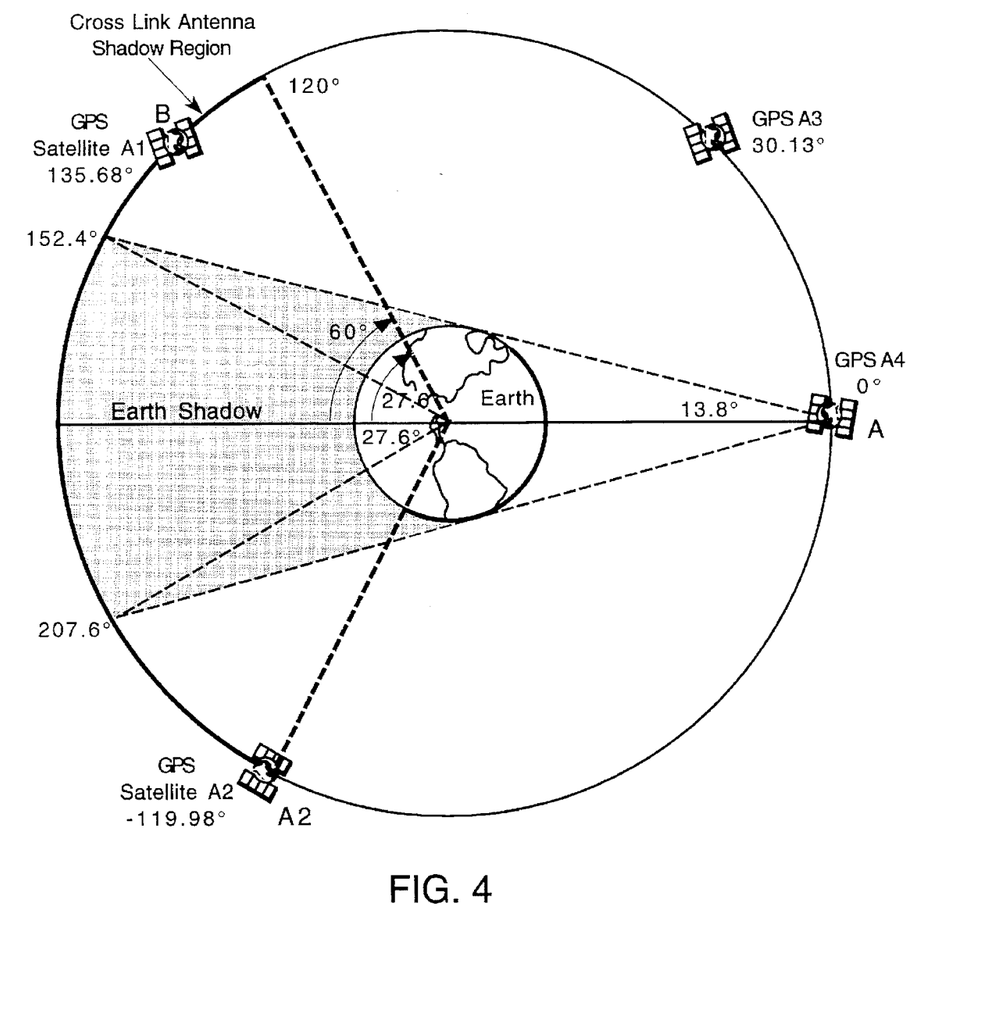
FIG. 4 is an example of satellite shadowing.

As stated above, GPS Paging/Messaging System exploits unusable L3 downlink capacity. For each satellite "A" there is always one satellite "B" in the same orbital plane which is opposite "A" in the orbit so that crosslink transmissions from "B" are nearly blocked by the earth but outside the crosslink antenna pattern so that they are not received by satellite "A" as shown in FIG. 4. Therefore, under these conditions, the crosslink slot used by satellite "B" is available for GPS Paging/Messaging System use on satellite "A" without interference to the NDS. The GPS constellation utilizes four equally spaced satellites in each of six orbit planes. Since the satellites are spaced at 90° increments, one satellite is always 180° on the other side of the earth and hence shadowed by the earth. There are actually two unused time slots since satellite i does not receive its own time slot. However, for the Block II and IIA satellites, the NDS cross-link receiver is gated off during this time slot and it is unavailable.

Normally, NDS operates at 11,000 symbols per second (sps) with rate ½ convolutional coding producing 5,500 bits per second (bps) data. NDS receivers use multi-beam antennas with significant gain. The proposed downlink message waveform operates at a lower effective bit rate than NDS, permitting highly reliable reception by hand-held or mobile receivers with omnidirectional antennas. By using rate ⅓ convolutional coding, redundancy and block error detection, the effective bit rate is reduced by a factor of approximately 12 to one. Since the rate ⅓ decoding provides a coding gain of 7 dB, the resulting signal has all advantage of about 18 dB (a factor of 63) relative to uncoded 11,000 sps signals or by 10 dB relative to rate ½ coded 5,500 bps normal NDS traffic. This increased performance permits the use of small hand-held units and omnidirectional receive antennas with 20 dB less gain than produced by the ND multi-beam antenna. The coding and redundancy are added by the paging/messaging injection interminal and require absolutely no change to the NDS payload or GPS satellite. Except for buffering, the satellite is transparent to the data, coded or otherwise.

Figure 5:
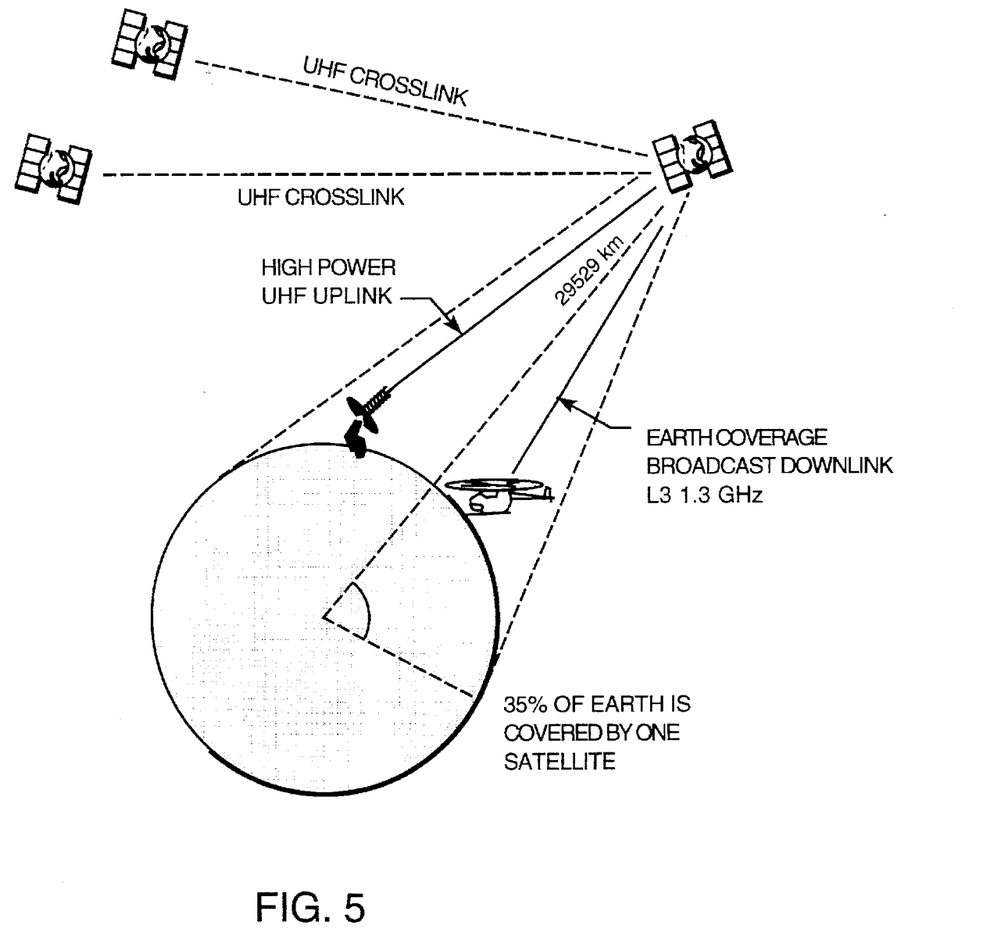
FIG. 5 is a GPS L3 Paging/Messaging System using one GPS satellite.
Figure 6:
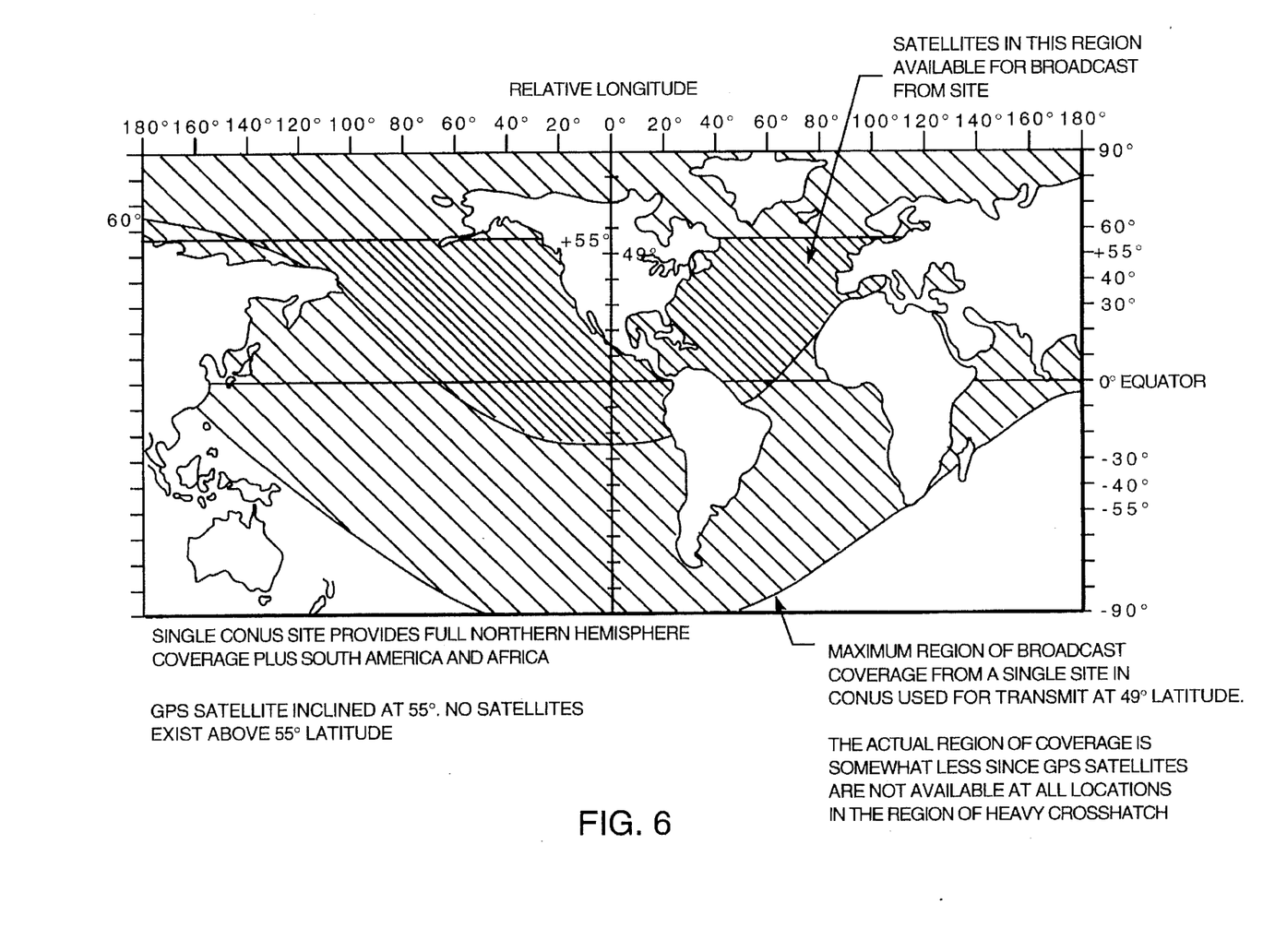
FIG. 6 is a GPS Paging/Memory System coverage from an example single conus transmit site at 49° latitude.
Figure 7A:
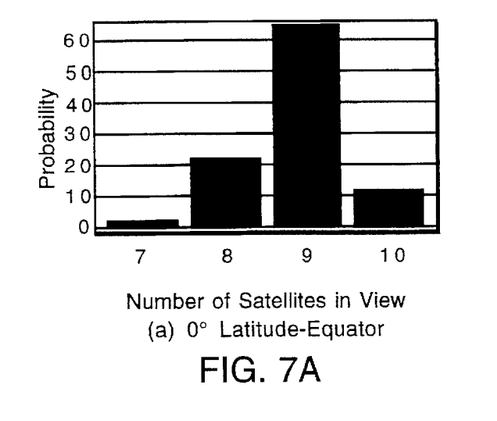
FIG. 7 is a GPS satellite visibility for the GPS-24 satellite constellation for a 5° elevation mask angle.
Figure 7B:
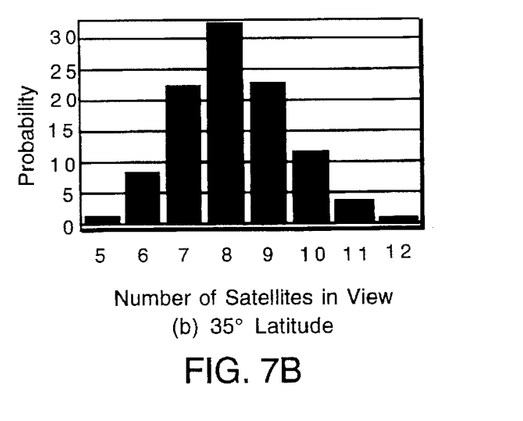
Figure 7C:
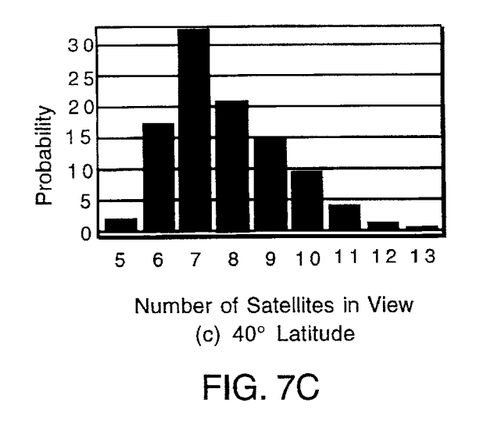
Figure 7D:
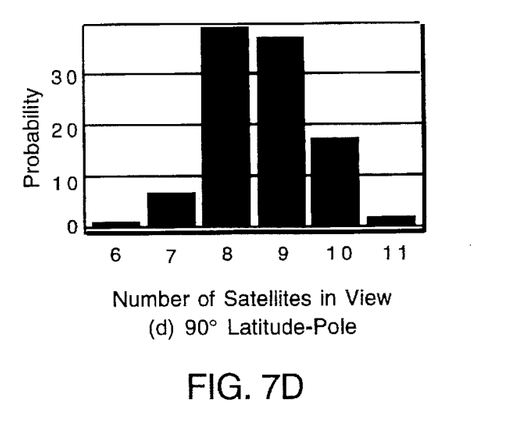

The hand-held or vehicle mounted paging/messaging receiver can provide both a navigation function and messaging function. The paging/messaging receiver uses technology similar to that used in a miniature GPS navigation receiver. It listens for signals in the LI and L3 channels from perhaps 6 to 8 differ satellites in view, and stands by in a ready mode for any L3 message signal that might appear. Messages addressed to the individual paging messaging receiver are demodulated, decoded, and decovered using decryption algorithm. Messages addressed to a specific user or class of users are displayed on the LCD screen of hand-held unit or a display in the vehicle. As shown in FIG. 5, a single uplink site transmitting to only one GPS satellite can reach users anywhere on 35% of the earth's surface. Through use of multiple satellites and multiple uplink transmissions, GPS satellites can broadcast messages to users over wide areas of the earth from a single site. By transmitting to multiple satellites with multiple antennas, more messages can be transmitted nearly simultaneously to users in a given theater. Multiple theaters can be covered from one ground site if necessary. For example, FIG. 6 shows the region of GPS satellite availability at a single uplink site at 49' latitude in the Continental United States. The light crosshatched region shows the user coverage region, the message receivers can be almost anywhere in the cross-hatched region.

FIG. 7 shows the GPS satellite visibility statistics for the present constellation at various latitudes averaged over longitude. This shows GPS satellite visibility for the GPS-24 satellite constellation for a 5° elevation mask angle. The bar charts correspond to user latitudes of 0°, 35°, 40°, 90° reading left-to-right, top-to-bottom. From B. Parkinson and J. J. Spilker, Jr., et al. "The Global Positioning System," in publication by the AIAA. Note that at the mid-latitudes there are typically at least six and often as many as ten satellites in view. If the transmit site is not too distant from the receive area, most of these satellites are in common view and available for GPS message service.

Figure 8:
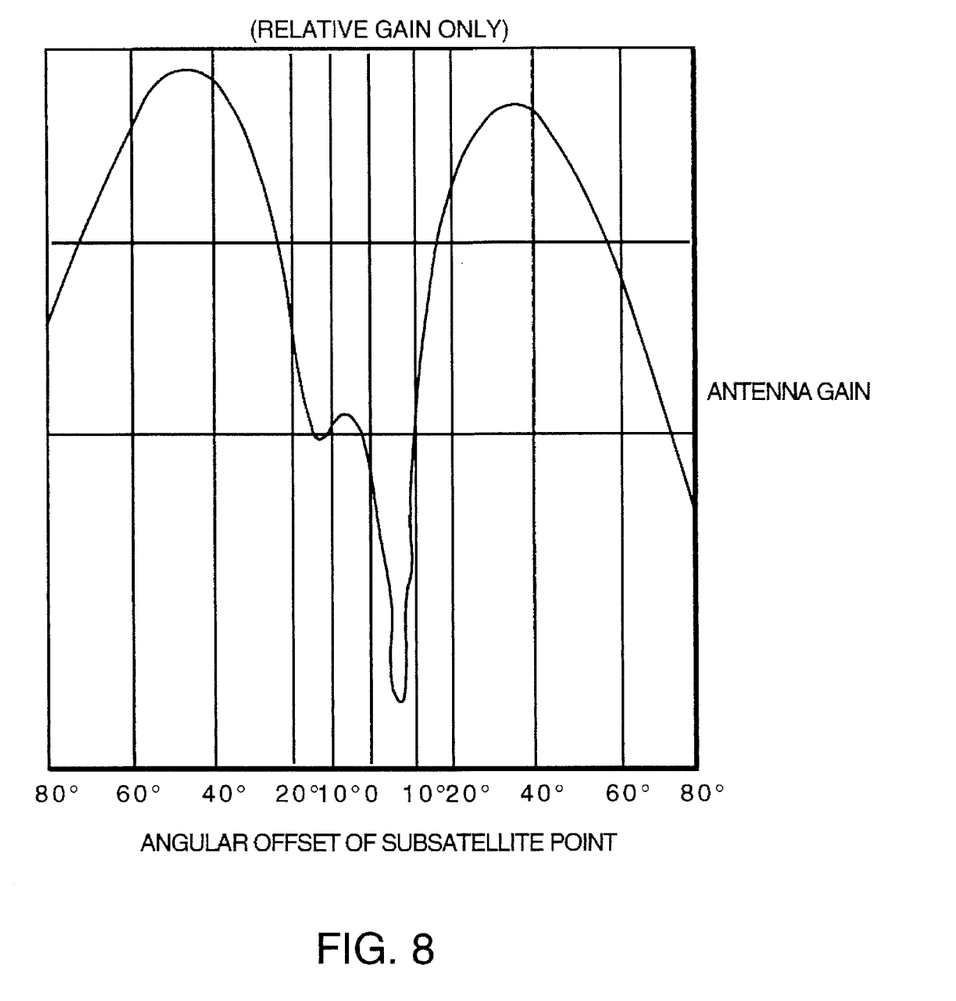
FIG. 8 is a GPS cross-link antenna pattern measurement.

1) L3 Uplink Nulling. The GPS Paging/Messaging System uplink is really being used to emulate a satellite-to-satellite cross-link, and the satellite receive UHF antenna has an intentional null towards the earth where the paging/messaging injection terminal is located. FIG. 8 shows GPS cross-link antenna pattern measurements. UHF antenna nulling towards the earth. The position of the null varies somewhat with azimuth. However, the depth of the null is easily accommodated by a friendly user with reasonable antenna gain and power. That statement is not true however for a potential jammer who cannot replicate this FH AJ uplink UHF.

However, the null is rather narrow and not very deep, generally between 10 and 20 dB. The null is deep enough so that when coupled with the spread spectrum signal processing it is sufficient to provide good jamming protection. The paging/messaging injection terminal can avoid the deepest part of this null by avoiding satellites which are nearly directly overhead. Since the satellite UHF power amplifiers are only 70W on Block II and lOOW on Block IIA, a higher power ground terminal with antenna gain can produce the same received isotropic power (RIP) as is received from a distant crosslink transmitter. Because the paging/messaging injection terminal can generate the appropriate frequency hopping pattern to be received by the GPS satellite, it can get through reliably while signals without this knowledge are rejected. Furthermore, because the downlink can be monitored using a paging/messaging receiver at the P/M1T, the paging/messaging injection terminal can determine if the message is being properly transmitted.

2) NDS Availability: The NDS system is completely available to the full extent originally planned even when the proposed GPS Paging/Messaging System is in full operation. For every GPS satellite visible to the paging/messaging injection terminal, another is diametrically on the opposite side of the earth and hence is blocked by the earth from sending crosslink messages to the visible satellite as shown in FIG. 4. It is the time slot of this potential crosslink message that we propose to assign to the GPS Paging/Messaging System transmission. The message signal structure is easily designed so that it is not confused with NDS messages and vice versa.

Figure 9:
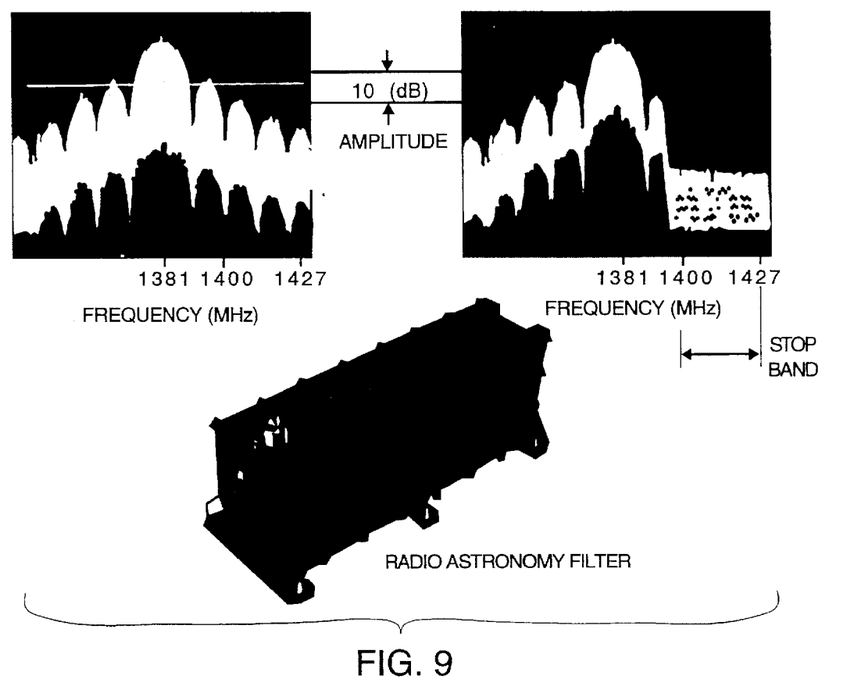
FIG. 9 is a radio astronomy filter used in the GPS satellite.

3) Potential Interference with Radio Astronomy: The L3 channel is at 1381.05 MHz and is spread with a 1.023 MHz GPS C/A code. One of the radio astronomy bands surrounds the hydrogen atom resonance at 1420.4 MHz. The radio astronomy band extends from 1400 to 1427 MHz, with the lower edge approximately 20 MHz above the GPS L3 channel. A band stop filter in the GPS satellites greatly attenuates the L3 channel emissions in the radio astronomy band (see FIG. 9). In addition, since the L3 channel is active only 1/24 of the time, the average signal power is attenuated by an additional 13.8 dB. It is possible for the radio astronomers to avoid L3 interference completely because the GPS L3 transmitters transmit only in a specified 1.5 sec time slot. If the radio astronomy antenna happens to point momentarily at a GP satellite, it can easily time gate the GPS L3 signal and remove it completely. However, with a duty factor of only 4.2% there should be no need to go to this effort.

4) Excessive Use of GPS Satellite Power: The transmission of the L3 signal uses extra power from the GPS satellite. However, the L3 signal is not on continuously for the GPS Paging/Messaging System; in fact, the duty factor is only $\frac{1}{24}=4.2\%$ and there should be no significant impact on the satellite even when messages are transmitted at a rate of 2400 per day from the satellite. There is minimal impact even if the duty factor were 10%, and it is not even half that amount. Furthermore, if there is only a single ground transmitter site, a satellite would be used for only roughly four hours per day. If four satellites are continuously in view, there can be 9,600 messages transmitted per day but the satellites and crosslink slots used change with time. Thus this limited number of messages has no impact on the satellite operation.

In view of the above, none of these concerns appear to be a real problem.

"Out of View" Region Because of Cross-link Antenna Pattern

Figure 10:
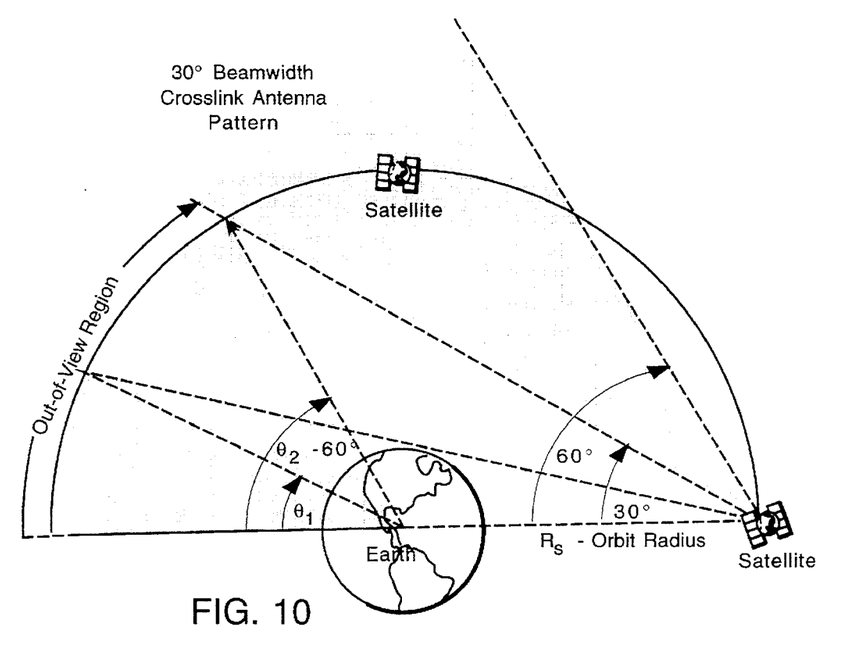
FIG. 10 is "out-of-view" region because of satellite's crosslink antenna pattern.

Although only one time slot of the 24 is planned for use by the GPS Paging/Messaging System, it is important to point out that the cross-link antenna pattern central null can prevent a satellite from being available to the crosslink and hence "out of view" as well. FIG. 10 shows the 30° beamwidth cross-link antenna pattern which extends from 30° off the satellite to earth center axis to 60° off of that axis. This beamwidth causes any satellite which falls within the earth center angle $\theta_2=2\times30°=60°$ to be "obscured" rather than just those in the earth shadow region $\theta_1$.

The region "out of view" of the cross-link antenna is a spherical section of surface area:

$$A=R_s^2 2\pi(1-\cos\theta_2)$$

and the fractional surface area relative to the surface area of the sphere $4\pi R_s^2$ is then:

$$\alpha=\frac{A}{4\pi R_s^2}=\frac{(1-\cos\theta_2)}{2}=\frac{1-\cos60°}{2}=0.25$$

One would then expect roughly 25% of uniformly distributed satellites to be "out of view," i.e., for 24 satellites a total of 0.25×24=6 satellites, including one in the same orbit plane. This amounts to one satellite in each orbit plane. Clearly, some satellites maybe closer to the beam region than others. Since the antenna gain does not decline rapidly outside of beam, some of the satellites in the "out of view" region of FIG. 10 could receive the very infrequent NDS crosslink transmissions from the satellite i of FIG. 8.

In summary, the GPS Paging/Messaging System of this invention provides a worldwide service of one-way secure paging/messaging to potentially thousands of hand-held and vehicle mounted units. The users can be anything from a soldier in a foxhole to a stealth fighter, helicopter, or ship. The uplinks can be in CONUS or at a field mobile command post mounted on a HMMWV. The uplink antenna beam is relatively broad and might, for example, be a dual or quad helix antenna which can be set up rapidly and easily pointed.

A single uplink site can contain several uplink antennas transmitting to several GPS satellites in parallel. Thus, the user can receive several parallel messages redundantly or several messages can be transmitted to different users in the same 36 second frame. A single site can broadcast messages to users in over half the earth's surface.

While preferred embodiments of the invention have been shown and described, it will be appreciated that various modifications and adaptations of the invention will become apparent to those skilled in the art.

What is claimed is:

1. A paging/messaging system using the L3 transmission channel of a constellation of GPS satellites orbiting the earth, comprising:

an earth-based injection terminal having a source of paging/messaging signals and a UHF radio transmitter having an anti-jam uplink channel for broadcasting said paging/messaging signals on an anti-jam uplink transmission channel to in-view ones of said constellation of GPS satellites, and a plurality of earth-based mobile receiving stations, each mobile receiving station having an omnidirectional receiving antenna and an L3 transmission channel receiver for receiving the L3 transmission channel broadcasts from said in-view ones of said constellation of GPS satellites and demodulating and decoding to recover the paging/messaging signals and means to present the paging/message signals to a designated user.

2. The paging/messaging system defined in claim 1 wherein at least one of said earth-based mobile receiving stations includes GPS position receiver means for receiving GPS signals from said in-view satellite and determining the position of said mobile receiving station.

3. A paging/messaging system using the L3 transmission channel of a constellation of GPS satellites orbiting the earth, comprising:

an earth-based injection terminal having a source of paging/messaging signals and a frequency hopped UHF radio transmitter, said UHF radio transmitter having an anti-jam uplink channel for broadcasting said paging/messaging to in-view ones of said constellation of GPS satellites, and a plurality of earth-based mobile receiving stations, each mobile receiving station having an omnidirectional receiving antenna and an L3 transmission channel receiver for receiving the L3 transmission channel broadcasts from said in-view ones of said constellation of GPS satellites and demodulating and decoding to recover the paging/messaging signals and means to present the recovered paging/message signals to a designated user.

4. The paging/messaging system defined in claim 3 wherein at least one of said earth-based mobile receiving stations includes GPS position receiver means for receiving GPS signals from said in-view satellite and determining the position of said mobile receiving station, and presenting said position to said user.

* * * * *